United States Patent [19]

Vinal

[11] Patent Number: 4,484,238

[45] Date of Patent: Nov. 20, 1984

[54] DUAL TRACK MAGNETIC RECORDING METHOD

[75] Inventor: Albert W. Vinal, Cary, N.C.

[73] Assignee: International Business Machines Corporation, Armonk, N.Y.

[21] Appl. No.: 388,783

[22] Filed: Jun. 15, 1982

[51] Int. Cl.³ .............................................. G11B 5/09
[52] U.S. Cl. ......................................... 360/47; 360/40
[58] Field of Search ........................... 360/40, 47, 121

[56] References Cited

U.S. PATENT DOCUMENTS

| 3,281,804 | 10/1966 | Dirks | 360/47 |
| 3,287,713 | 11/1966 | Porter | 360/121 |
| 3,665,430 | 5/1972 | Hinnicks et al. | 360/47 |
| 3,962,726 | 6/1976 | DeLand, Jr. | 360/51 |
| 4,303,956 | 12/1981 | Kobubu | 360/121 |

FOREIGN PATENT DOCUMENTS

| 3131069 | 8/1981 | Fed. Rep. of Germany . | |
| 792314 | 3/1958 | United Kingdom | 360/47 |

OTHER PUBLICATIONS

Electronik, No. 26, 12-31-82, p. 18, "Floppy Disks", Einfuhrung in die Datenverarbeitung, pp. 87-90, author: Gorny.

Primary Examiner—Vincent P. Canney
Attorney, Agent, or Firm—Edward H. Duffield

[57] ABSTRACT

A unique dual track recording technique is described in which complementarily magnetically poled regions are simultaneously written in adjacent positions in two parallel tracks. Multi-track recording of magnetic data transitions in oppositely poled matched zones in the separate tracks provides a high flux coupling to a magnetic sensor. The sensor is exposed to the combined flux from both tracks. This also provides a high degree of data redundancy in the event of small physical anomalies in the magnetic medium or writing anomalies in one track or the other. Because a large magnetic field may be coupled, a magnetic sensor may be positioned at some substantial distance above the magnetic medium on which the data is recorded. This overcomes a significant problem in data reading and writing. The present limits of proximity to the magnetic medium of the sensor head or write head have been reached and still higher data density is desired. A high data density recording method is thus described which creates a significant field coupled to a sensor position at a substantial distance above the magnetic storage medium. Reading and writing data at densities upwards of 50,000 flux changes per inch and with channel densities of 4000 per inch may be achieved.

4 Claims, 9 Drawing Figures

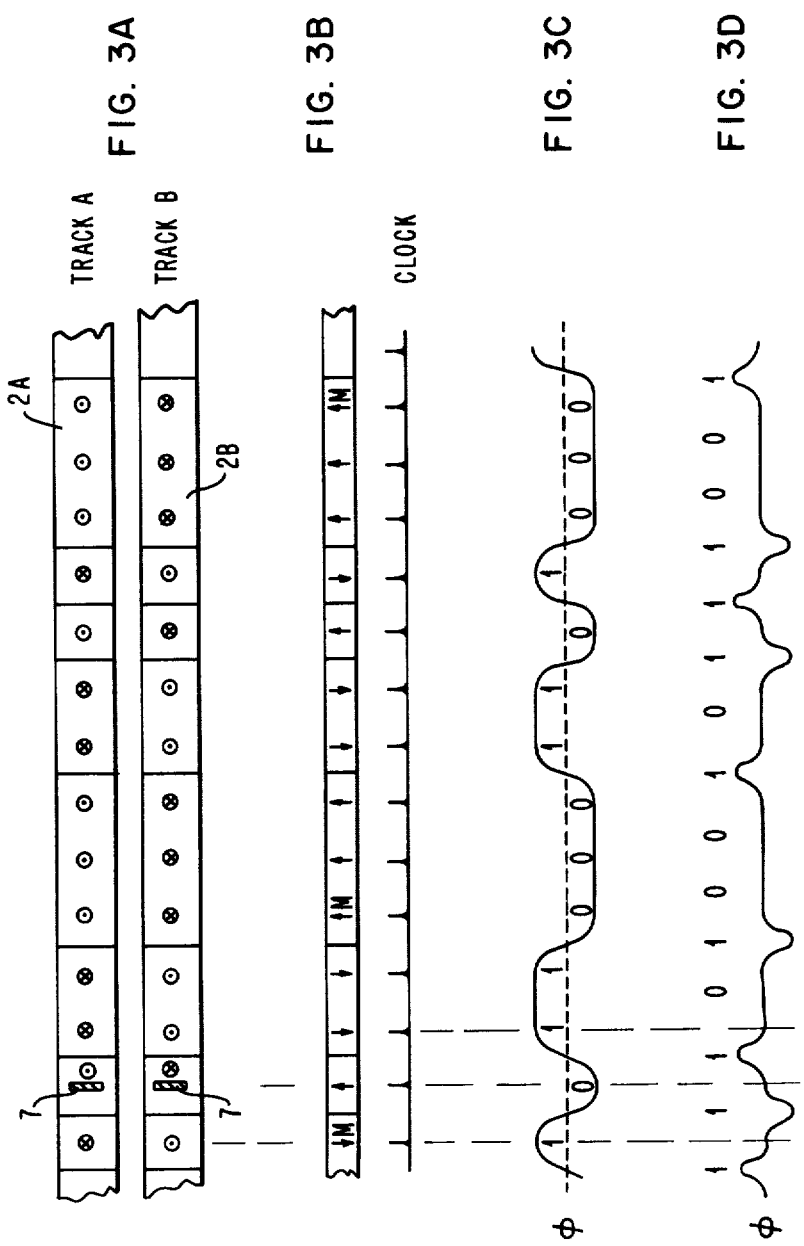

DUAL TRACK MAGNETIC RECORDING METHOD

RELATED APPLICATIONS

This application is related to co-pending patent application Ser. No. 388,784, commonly assigned herewith and filed simultaneously herewith dealing with an improved magnetic read head structure.

FIELD OF THE INVENTION

This invention relates to magnetic data recording reading and writing techniques in general and specifically to an improved high flux coupling technique utilizing data simultaneously written in at least two tracks on a magnetic medium.

PRIOR ART

A variety of magnetic recording techniques exist in the prior art. A typical non-return to zero (NRZ) technique well known in the prior art records magnetic data in a single track by reversals in magnetic polarization. These may be either longitudinally reversed in the magnetic medium surface or vertically reversed perpendicular to the surface. A clock track may or may not be written in some adjacent area. Alternatively, the clocking may be provided by a phase locked oscillator timing from the magnetic data transitions, or the like. Generally, the signal data content is decoded by observing the read head signal output polarity at each clock transition. Alternatively, the signal polarity may be differentiated to provide a series of positive and negative peaks which occur at the transitions between magnetization direction on the medium. A wide variety of encoding techniques exist and are well known. For example, binary 1's may be represented in one specific technique as the presence of a transition at a given clocking time (that is, a pulse occurs at the clocking time in the signal channel coming from the read head) and the absence of a pulse at the clock time represents a binary 0. Another technique utilizes the polarity of the signal, with positive signals representing one of the binary data characters and negative polarity signals representing the other. And numerous combinations of these techniques exist as well.

The foregoing general data recording techniques being well known, need little further discussion. However, they do suffer from a wide variety of commonly associated technical problems in connection with the ability to couple sensible magnetic field flux levels from the magnetic medium to a magnetically sensitive read head positioned at some distance above the medium. Permeable magnetic material is often used to couple the flux at the transitions from a position in close proximity to the magnetic medium up to a sensor located at some distance above the medium. An example is in U.S. Pat. No. 3,921,217, in which magnetic coupling members carry the flux transitions from a single recording track upward to and through a magnetic sensor element and back to the recording track in reading. Any of the various types of magnetic recording techniques previously described can be employed with such a read head. However, as flux transitions per inch (representing overall data density) increase, it is necessary to move the coupling members, and hence the sensor, closer and closer to the magnetic medium. Practical limits in the size range of several microinches flying height above the magnetic medium eventually are reached. In a push for still higher densities, it is necessary either to develop more sensitive magnetic read heads, an ongoing effort involving a variety of technologies, or to develop a recording technique which is capable of providing higher flux or field magnitude changes and coupling to the magnetic sensing members. This latter aspect is the object of the present invention.

OBJECTS OF THE INVENTION

In view of the foregoing known difficulties with prior art data writing or recording techniques, it is an object of this invention to provide an improved magnetic medium data writing technique utilizing a plurality of tracks simultaneously for the storage of the same data in a fashion which greatly increases the magnetic field available for coupling to a sensor.

Still a further object of the invention is to provide an improved magnetic writing technique in which data redundancy is present to overcome loss of data bits due to magnetic abnormalities in the magnetic medium, contamination of the medium surface, or the like.

SUMMARY

The foregoing and still other objects of the invention not specifically described are met by providing a plural track recording technique. In this technique, at least two parallel recording tracks on a magnetic medium are written simultaneously but with complementarily magnetically polarized transitions corresponding to each data bit written. A magnetic read head is then positioned to straddle both tracks and couple flux from the positive pole in one track through the sensor to the negative pole on the adjacent track in the corresponding location or vice versa. The tight flux coupling thus produced increases the magnetic field strength passing through the sensor for a given flying height above the surface of the magnetic medium. Magnetic transition regions are simultaneously written on at least two narrow parallel tracks that form a single data channel. Digital data is written along the length of a storage medium, be it tape, a spinning disc or the like, but the direction of magnetization reversals written in a first track are opposite to those simultaneously written in a second track and the read head will be subjected to the flux reversals from both tracks simultaneously during read back.

BRIEF DESCRIPTION OF DRAWINGS

This invention will now be described with reference to a preferred embodiment thereof, which is further illustrated and described by reference to the following figures in which:

FIG. 3A illustrates a top or plan view of a dual track vertically magnetized magnetic recording medium.

FIG. 3B illustrates a horizontal cross sectional view of the magnetic medium in FIG. 3A and also depicts a typical clocking track sequence.

FIG. 3C indicates the signal polarity defining the binary data content on the basis of signal polarity in relationship to the clock track.

FIG. 3D illustrates the differentiated waveform of FIG. 3C and indicates data content on the basis of presence or absence of a pulse of either polarity.

DETAILED SPECIFICATION

Figure 1A:
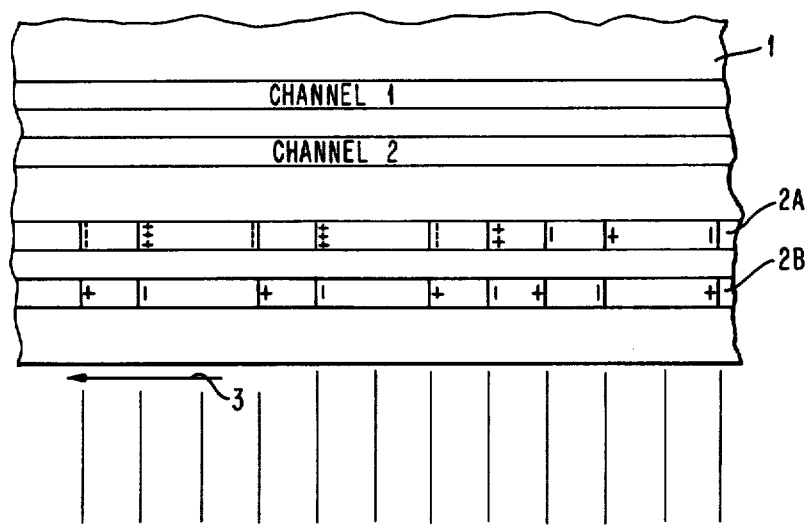
FIG. 1A illustrates a general plan view of a tape or disc medium on which magnetic transitions have been written longitudinally for a single channel in a pair of parallel individual tracks.

Turning to FIG. 1A, a plan view of a tape or disc medium for magnetic recording of data is shown with two parallel data tracks written for each of two channels labeled Channel 1 and Channel 2. It should be clearly understood that other tracks may be interspersed between the tracks illustrated, portions of channels may use interleaved spacing between other tracks or channels, and that the data channels need not be directly adjacent one another as illustrated. In general, the separation distance between the data tracks is not critical insofar as the writing of data is concerned but can improve the optimal design of a read back head by creating a head with a minimum of field leakage paths between tracks. In FIG. 1A, the magnetic medium 1 may be a disc or tape carrying any of a wide variety of known magnetizable materials. Data tracks 2A and 2B comprising a channel of data labeled Channel 2 are also shown schematically. The small positive and negative symbols illustrate positive and negative or north/south magnetic pole orientations of magnetization discontinuity in the medium. It will be understood by those of skill in the art, that in longitudinal magnetic recording the magnetic vectors are aligned to lie generally in the plane of the magnetic medium. They are directed either to the left or to the right depending on whether they are positive or negative.

Figure 1B:
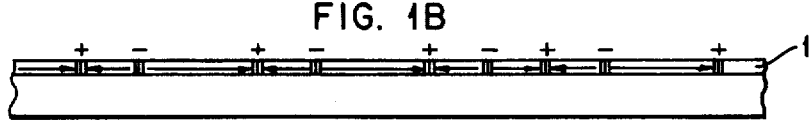
FIG. 1B is positioned directly below FIG. 1A and shows a horizontal cross section of the magnetic recording medium and the flux reversals therein.

FIG. 1B illustrates the point by showing a cross sectional view of a typical magnetic medium 1 in which one of the data tracks 2A or 2B is shown to be a series of magnetization vectors M directed either to the left or to the right and creating positive or negative magnetic poles at the transition between magnetization directions. An arrow 3 indicates the general direction of motion of the magnetic medium.

Figure 1C:
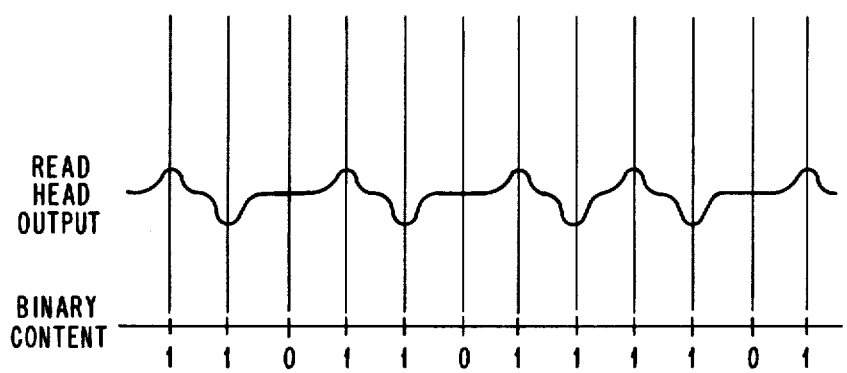
FIG. 1C is aligned below FIGS. 1A and 1B and shows a typical read head signal polarity output corresponding to the magnetic transitions on the medium. It also includes a typical clock track and the binary data content for an assumed encoding technique.

In FIG. 1C, a data clocking track is shown below a hypothetical read head signal output that would be created by a magnetic sensor read head scanning along the tape or disc media 1 from left to right. The positive amplitude signal portions are those produced near positive magnetic pole transitions, the negative pulses correspond to negative pole transitions and relatively flat portions correspond to those areas of the magnetic medium where no magnetization vector changes occur. The clock track may either be a recorded fixed frequency series of pulses recorded on another section of the magnetic medium as is commonly done, or may be a derived phase locked oscillator pulse frequency that is derived from the occurrences of data pulses.

In FIG. 1A, it may be observed that Channels 2A and 2B are written with magnetic transition regions adjacent one another but of opposite polarity in each case. The discontinuities in the magnetization vectors represented by the positive and negative symbols are the result of abruptly reversing the direction of writing current applied in a magnetic data writing head. In a typical NRZ data encoding technique, the discontinuities in magnetization represent binary data 1's or 0's and the absence of transitions or discontinuities represent 0's or 1's respectively. The two separate tracks 2A and 2B that make up one data channel may typically be separated by one-half of the width of each track. As previously noted, the separation distance is not critical insofar as writing the data is concerned but can aid in the designing and optimum read back head structure by minimizing the field leakage paths.

Figure 2A:
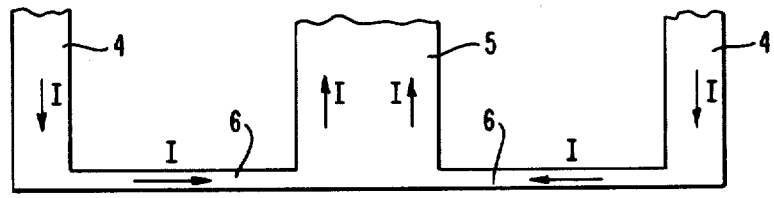
FIG. 2A illustrates, in schematic cross sectional form, the operative conductive portions of a dual track recording head for simultaneously recording opposite polarities in two parallel tracks.
Figure 2B:
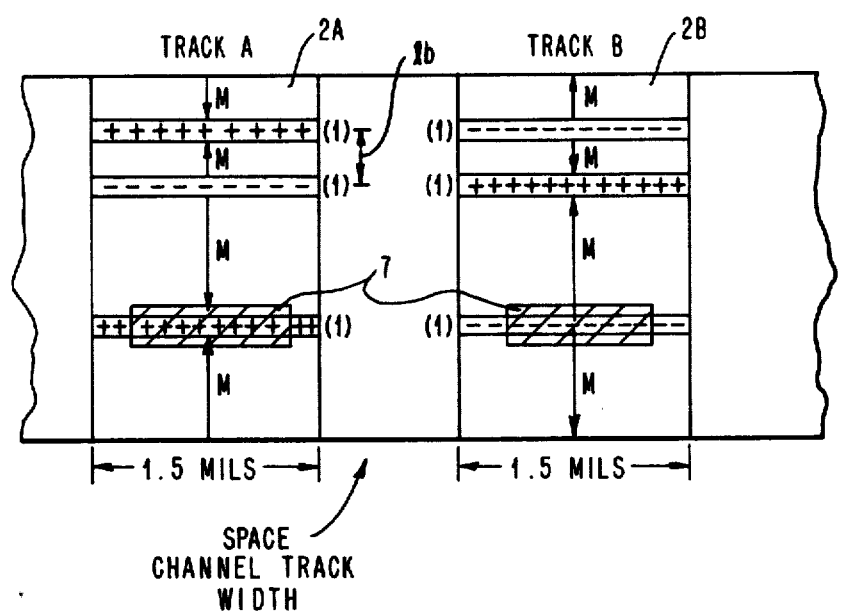
FIG. 2B illustrates a top or plan view of a portion of a magnetic medium having two oppositely polarized adjacent data tracks similar to those that would be written by the write head structure schematic in FIG. 2A and also illustrating the general foot print area of a read head coupling leg structure as detailed more specifically in the aforementioned co-pending patent application.

In FIG. 2A, a schematic portion showing a partial cross section of a hypothetical writing head is shown. Current can be simultaneously introduced in the two outward vertical conductor bars 4 and conducted away by the interior common conductor bar 5. It will be observed that the currents passing through each loop are in opposite directions in the portion labeled 6 on the writing head. Current passing through such a device is known to produce a magnetization vector in the magnetizable medium if the writing head is in close proximity to such a medium at the time the current pulses are applied. The magnetic vectors will be generally in the plane of the magnetizable medium and will be directed as depicted in FIG. 2B either one way or the other in correspondence with whether the current flow I is directed downwards in legs 4 of FIG. 2A or upwards in legs 4. This would correspond to current passing upward in leg 5 or respectively, downward in leg 5 and upward in legs 4.

In FIG. 2B, the resulting magnetization transition regions are shown as a series of horizontal positive and negative pole areas within each of the data tracks 2A or 2B making up a given channel. Typical dimensions for one embodiment are shown with each track representing a total width of about 1.5 mils with a ¾ mil spacing between the tracks. Thus, the total data channel would occupy approximately 3.75 mils and, with additional space to the left and right of the data tracks 2A and 2B, a total center-to-center channel density of approximately 4½ to 5 mils could be attained.

Superimposed over the magnetic transition regions shown in a portion of FIG. 2B, are oblong horizontal dashed areas 7 that represent the foot print swept out by magnetically permeable conductive bar that would be incorporated in a read head simultaneously scanning the two tracks 2A and 2B. Structure of such a read head is the subject of my aforementioned co-pending application Ser. No. 388,784 and will not be described further here. It is enough to say that the magnetic field from the transition regions in tracks 2A and 2B is simultaneously coupled from the complementarily magnetically polarized transitions regions, up magnetically permeable legs having a general bottom cross section depicted by the area 7 shown in FIG. 2B, and as these legs carry the magnetic flux upward, they may concentrate it by reducing the area of the legs 7 and pass it through an upper gap in which may be located a typical magnetic sensor. Preferably, such sensors utilize my magnetically sensitive transistors, such as those described in my copending patent application Ser. No. 253,128.

The magnetic field coupled through such a sensor in a gap between the two coupling legs 7 will be at a maximum when each of the legs 7 is directly over a magnetic transition region written along tracks 2A and 2B. The magnetic legs 7 typically have thicknesses about ⅓ the nominal distance $L_b$ between adjacent successive digital transitions written along the medium as depicted in FIG. 2B.

A leg thickness for the area 7 of approximately 4,000 Angstroms in the narrow dimension would be nearly nominal when data has been written at approximately 20,000 flux changes per inch or less. The width of each of the coupling legs 7 is slightly less than the 1.5 mil width of each track 2A and 2B.

An intense demagnetizing field limited to the coercive force of the magnetic medium itself exists at the surface of the medium for each abrupt reversal in magnetization polarity. The field component of the magnetic vector that is perpendicular to the tape surface may be coupled to the magnetic sensor by conduction through a magnetically permeable legs 7 upward out of the plane of drawing 2B to a smaller gap in which is positioned a sensor, not shown. Since the direction of the demagnetizating field developed in one track will always be opposite to that simultaneously developed in the other track, a maximum coupling and field intensity will be created and will be passed through the sensor by coupling through the magnetic legs 7.

This situation may be easily contrasted with known prior art read head and writing technology and will be easily seen to provide approximately double the magnetic signal coupling for a given area of magnetic medium swept by a read head or coupling leg 7 in a single track.

If a wound coil writing head is utilized, it will typically have a central core extending down to the vicinity of the magnetic medium, the flux will flow there across a small gap and up another leg. The magnetic polarization vectors may be written in the vertical direction in the surface of the magnetizable medium. Such a situation is depicted schematically in FIG. 3A where a plan view of two tracks of data 2A and 2B similar to those shown in FIG. 1A are illustrated with vertically magnetized components complementarily poled as previously described.

A cross section of a magnetic medium together with a clocking track is shown below FIG. 3A as FIG. 3B. The magnetization vectors M may be seen to reside in either an upward or downward direction and the clock track again is arbitrarily shown and can be derived either from the magnetic transitions (displaced ½ bit time) or from a recorded clock track recorded on the medium but not shown.

FIG. 3C illustrates the signal polarity output that would be produced by sensors having coupling legs 7 as shown in FIG. 3A moving along the data tracks from left to right. The data may be recorded in the absolute form for example, with positive polarity indicating data 1's and negative polarity indicating data 0's as depicted in FIG. 3C. Alternatively, another well known encoding technique is differential in which the pulses of the differentiated waveform from FIG. 3C are shown in FIG. 3D. The presence of a pulse may be arbitrarily assigned significance as a data bit 1 and the absence of a pulse coincident with a clock signal can indicate a 0 or vice versa.

It may be seen that the technique of writing the binary data as a series of complementarily poled magnetization vectors either in the horizontal or vertical direction within two parallel data tracks to form a single data channel has been described.

Such a recording technique can be easily achieved using known write head structures not forming a part of this invention. The beneficial advantages of the invention which produce much higher field intensities for coupling through a magnetic sensor either of the magnetic transistor or magnetic resistor form as known in the art, can easily utilize this increased field intensity produced as noted by the complementarily poled simultaneous writing technique.

Having thus described my invention with reference a preferred embodiment thereof, it may be easily understood by those of skill in the art that the twin track recording technique shown and described limits the probability of error due to imperfections in the medium which can occur in a manner which obliterates data. For example, imperfections in the medium do occur but will be most improbable to occur at exactly the same location at each track. Thus data drop out and associated problems known to those of skill in the art will be greatly alleviated by the present invention.

Having thus described my invention, what I desire to protect by Letters Patent is:

1. A magnetic recording method, comprising steps of:
   writing a magnetizable magnetic medium with two tracks of magnetic polarities to represent data by simultaneously polarizing said tracks on said medium with laterally adjacent corresponding areas thereof having complementary magnetic poles whose combined track to track properties represent data.

2. A method as described in claim 1, wherein:
   said parallel tracks are written with vertically oriented magnetic polarization vectors relative to the surface of said medium.

3. A method as described in claim 1, wherein:
   said parallel tracks are written with horizontally oriented magnetization polarizations relative to the surface of said medium.

4. A method as described in claim 1 or 2 or 3, wherein:
   said writing in said two parallel tracks is conducted at a spacing between tracks of approximately ½ the width of either track.

* * * * *